United States Patent [19]

Epstein

[11] 4,035,552
[45] July 12, 1977

[54] ELECTROCHEMICAL CELL

[75] Inventor: James Epstein, Sharon, Mass.

[73] Assignee: GTE Laboratories Incorporated, Waltham, Mass.

[21] Appl. No.: 708,141

[22] Filed: July 23, 1976

[51] Int. Cl.² .................................. H01M 10/34
[52] U.S. Cl. .............................................. 429/58
[58] Field of Search ................ 429/58, 59, 60, 57, 429/61, 62; 320/34, 36, 46, 47

[56] References Cited

U.S. PATENT DOCUMENTS

| | | | |
|---|---|---|---|
| 3,546,024 | 12/1970 | Niklos | 429/61 |
| 3,617,386 | 11/1971 | Bosben et al. | 429/56 |
| 3,622,397 | 11/1971 | Belove | 429/58 |

Primary Examiner—C. F. LeFevour
Attorney, Agent, or Firm—Irving M. Kriegsman; Robert A. Seldon

[57] ABSTRACT

An electrochemical cell is disclosed having an internal circuit which is interrupted by a switch that is responsive to both excessive cell temperature and pressure. The switch preferably comprises a bimetallic strip mounted in the space between the cell cover and case and is electrically connected between one of the cell electrodes and its associated terminal. The bimetal undergoes temperature-induced distortion to open-circuit the cell and is additionally responsive to the movement of a pressure diaphragm, which forms a part of the cell case wall, to open-circuit the cell in the event of excessive pressure. The cell is automatically reactivated when the excessive condition has dissipated.

6 Claims, 1 Drawing Figure

U.S. Patent     July 12, 1977     4,035,552
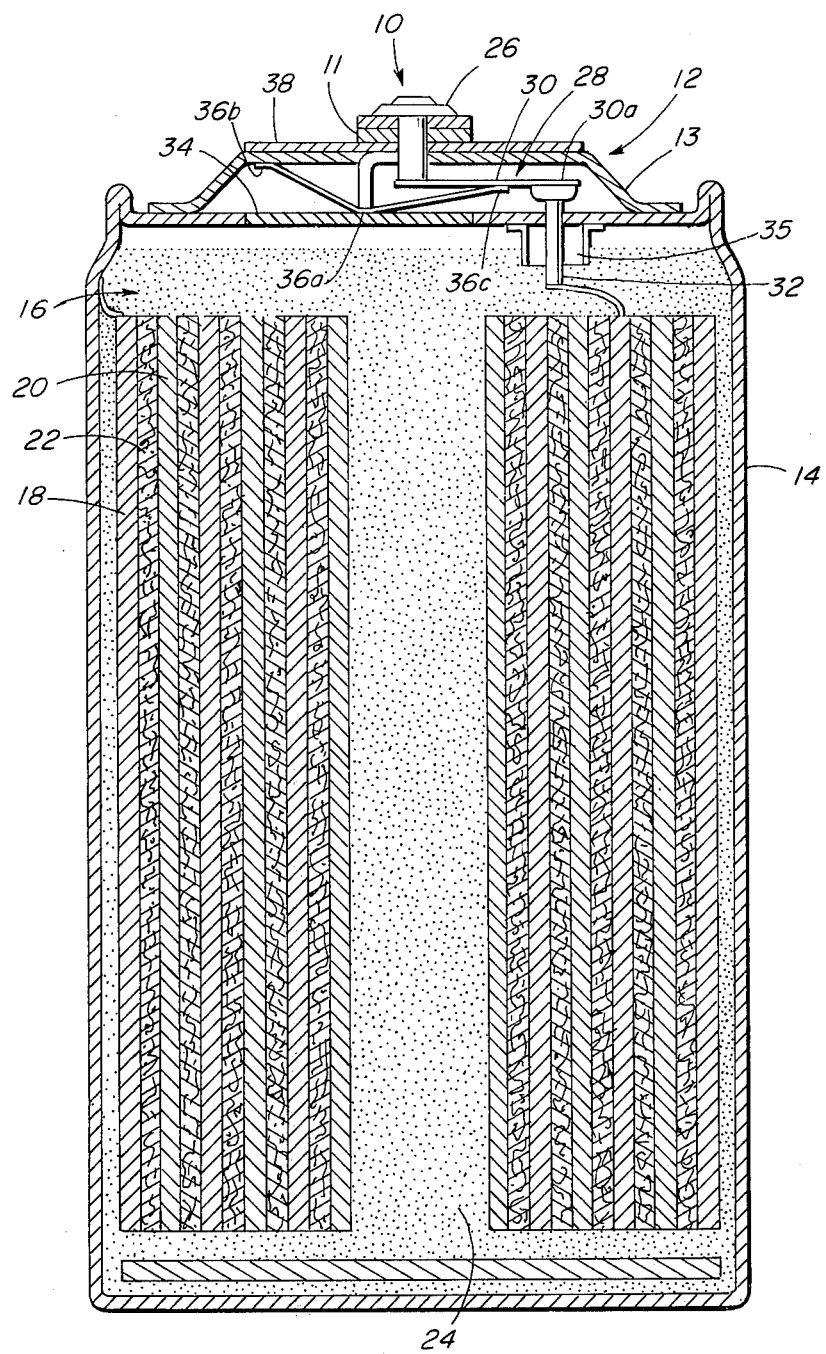

ELECTROCHEMICAL CELL

FIELD OF THE INVENTION

This invention relates generally to electrochemical power cells, and is more particularly concerned with those cells termed primary electrochemical cells.

In copending applicaton Ser. No. 685,214, filed May 11, 1976, and assigned to the assignee of this application, there is described a primary electrochemical cell having an oxidizable active anode material, such as lithium, a carbon cathode, an electrolytic solution between and in contact with the anode and cathode, the electrolytic solution comprising a covalent inorganic oxyhalide solvent, such as phosphorus oxychloride, monofluorophosphoryl dichloride, thionyl chloride, or sulfuryl chloride, and a solute dissolved therein. It has been found that the carbon cathode material catalyzes the electrochemical decomposition of the solvent during discharge of the cell, thereby enabling the otherwise dead weight of the solvent to be utilized as an energy source.

In U.S. Pat. No 3,923,543, issued Dec. 2, 1975, and assigned to the assignee of this application, there is described a primary electrochemical cell having an oxidizable active anode material, such a lithium, a cathode including, as the active cathode material, an intercalation compound of carbon and fluorine of the general formula $C_4F_{(N)}$, and an electrolytic solution between and in conact with the anode and cathode, the electrolytic solution comprising a covalent inorganic oxyhalide solvent selected from those set forth above, and a solute dissolved therein. It has been found that the above-identified intercalation compound will catalyze the electrochemical decomposition of the solvent resulting, unexpectedly, in a cell having a coulombic cathode utilization effeciency greater than 100% of that theoretically obtainable according to reduction of the active cathode material. Once again, the otherwise dead weight of the electrolytic solvent can be utilized as a source of energy.

The electrochemical cells described in the above-referenced applications are among the highest energy density packages currently known in the art. Accordingly, it has been necessary to deliver electrical energy therefrom at controlled discharge rates, since the internal cell resistance and the rate of discharge determine the heat generation in the cell. If the rate of heat dissipation from the battery to the environment is smaller than the rate of heat generation inside the battery, the cell temperature will increase to a point where some of the cell components will react instantaneously with each other. The cell characteristics accordingly change from an electrochemical system to a chemical system, releasing all the energy of the system at once and producing a potentially explosive condition. It is accordingly desirable to allow the cell to be discharged at any rate so long as the cell is at a temperature less than a preselected cut-off temperature.

It is additionally desirable to discharge the cell only while the internal cell pressure is below a predetermined level. A danger in sealed cells of many kinds stems from the uncontrolled formation of gases within the cell structure which may be caused by overcharging of the cell, over discharging of the cell, or overheating.

SUMMARY OF THE PRIOR ART

In U.S. Pat. No. 3,622,379, there is disclosed a rechargeable nickle cadmium cell in which a thermal switch is mounted external to the cell case and electrically connected between the cell and a recharging source to cut off the recharging current upon the attainment of a certain temperature. Since the switch is outside the cell it does not sense the cell temperature, but rather the temperature adjacent to the cell case. Furhermore, since it is connected between the cell and the recharging source does not prevent the cell from discharging when a preselected temperature is exceeded.

In U.S. Pat. No. 3,617,386, there is disclosed a sealed electric battery a hydrogen-permeable diaphragm with a circumferential annular projection, a contact surface electrically connected to one of the electrodes and centrally located on the diaphragm within the projection, and a resilient electrically conductive member supported at its intermediate portions by the projection which contacts the battery cover at its end portions and bridges the centrally located contact surface of the diaphragm for electrical contact therewith. The diaphragm is responsive to the internal cell pressure to deformably straighten the resilient member and thereby debridge that member from the centrally located contact surface. It may be appreciated, however, that the battery disclosed therein may still be damaged by excessive heat without the internal pressure reaching the "debridging" point.

In U.S. Pat. No. 3,546,024, there is disclosed a thermoelectric switch which limits the charging of a cell when a preselected temperature is exceeded. The thermal switch is connected to a control contact and either the positive or negative pole of the battery to limit the charging current.

In U.S. Ser. No. 608,424, filed Aug. 28, 1975, and assigned to the assignee of the current application, there is disclosed a primary electrochemical cell having a thermal switch mounted within the cell case and electrically connected between one of the electrodes and its aassociated terminal to prevent the cell from being discharged when the internal cell temperature exceeds a predetermined level. Again, it may be appreciated that the cell is not protected from rupturing due to high internal cell pressure in the absence of temperatures exceeding the predetermined level.

SUMMARY OF THE INVENTION

Accordingly, it is an object of the present invention to provide a hermetically sealed battery having protective devices to independently relieve excessive internal pressure and temperature and to prevent the drawing of excessive currents.

It is another object of this invention to provide the above-mentioned devices in as small a volume as possible.

It is still another object of the invention to provide these devices in the void space under a conventional battery cover.

These and other objects of the invention are accomplished in an electrochenical cell described herein which comprises a hermetically sealed housing having an outwardly deformable wall section, an electrochemical system disposed within the housing and including a pair of electrodes respectively forming an anode and a cathode, and an electrolyte in contact therewith, a cover assembly affixed to the housing at least a portion of which serves as a first terminal associated with one of the electrodes, a second terminal associated with the second electrode, and a normally closed thermal switch disposed between the cover assembly and the housing. The thermal switch is electrically connected between one of the electrodes and its associated terminal and is arranged to open-circuit the internal electrical circuit of the cell to prevent cell discharge when the cell temperature exceeds a preselected level and to close again when the temperature drops below the preselected value. The swith is additionally responsive to the wall section deflection to interrupt the internal cell circuit and prevent cell discharge when the internal cell pressure exceeds a predetermined level. Accordingly, the cell may be discharged at any rate so as the temperature and internal pressure levels are not excessive. Additionally, the cell is reactivated once the excessive level has dissipated.

Other features and advantages of the cell will be apparent in the following detailed description of the preferred embodiment which is to be read in conjunction with the fllowing drawing.

BRIEF DESCRIPTION OF THE DRAWING

The FIGURE is a sectional view of a primary electrochemical cell constructed in accordance with the present invention.

DETAILED DESCRIPTION OF THE PREFERRED EMBODIMENT

Turning to the Figure, a section of an electrochemical cell shown generally at 10, comprises a cover assembly 12 including a cover 13, and a hermetically sealed ase 14. Disposed in the space identified by the reference numeral 16 within the case 14 are spiral wound electrodes. One of the electrodes 18 is made of an anode material such a lithium, while the other electrode 20 is made of a grid having a cathode material such as carbon on its outer surface. The two electrodes are separated from each other by a porous insulating separator 22. The cell is filled with a quantity of electrolytic solution 24, such as lithium tetrachloraluminate dissolved in thionyl chloride. Other materials for the electrodes and the electrolytic solution are fully described in the aforementioned references, the subject matter of which are hereby incorporated by reference.

The operative terminals of the cell are a portion of the cover assembly, such as an insulted rivet 26, and the case 14. The rivet 26 is attached to the cover 13 through a plastic spacer 11 and includes an insulating coating 38 so that the cover 13 may directly contact the case 14. Alternatively, the cover 13 may be insulated from the case 14 by means such as an insulating gasket. More complete teachings of the internal structure of such cells may be found in above-referenced copending application Ser. No. 608,424, and in U.S. Pat. No. 3,510,353, to McHenry, the content of which is also incorporated by reference.

A normally closed thermal switch 28, disposed in the space between the cover 13 and the housing 14, is series connected between the electrode 20 and its associated terminal, the rivet 26.

The switch 28 comprises a bimetallic element such as a strip 30 which is arranged to open-circuit the internal electrical circuit of the cell when the cell temperature exceeds a pre-selected level, thereby interrupting the cell discharge. Accordingly, a pin 32, formed from a material such as RODAR, is electrically connected to one of the electrodes 20 and brought out of the case 14 through a glass-to-metal seal 35. RODAR is an alloy of iron, nickel, and cobalt, made by Wilbur B. Driver Company, a subsidiary of General Telephone & Electronics Corporation, that is not chemically reactive within the electrolytic solution 24. One end 30a of the bimetallic strip 30 contacts the surface of the pin 32, while the other end is welded to the rivet 26. An increase in the cell temperature beyond a preselected level, preferably 80°C, will cause the strip 30 to undergo deformation moving the end 30a from the contact surface of the pin 32. Conversely, return of the bimetallic strip 30 to its normal shape will reactivate the cell when the excessive temperature level has dissipated. Preferably, the switch 28 will close at approximately 70°C.

The switch 28 is additionally resposive to excessive internal cell pressure to open-circuit the internal cell circuit. To this end, there is provided in the case 14 a deformable wall section which may conveniently be a 5 milthick diaphragm 34, formed from a nickel alloy, which is outwardly displaced by internal cell pressure.

The outward displacement of the diaphragm 34 deforms the strip 30 to move the end 30a from the pin 32. The displacement of the bimetallic strip end 30a may be made compartively large with respect to that of the diaphragm 34 by lever means such as a piece of generally V-shaped spring steel 36, having an offset apex 36a in contact with the diaphragm and one end 36b engaging the cover 13 for pivoting movement. The other end 36c of the spring steel engages the central portion of the bimetallic strip 30. Displacement of the diaphragm 30 will act upon the off-set apex 36a to accordingly cause a greater displacement of the spring steel end 36c and an even greater displacement of the bimetal strip end 30a away from the pin. In practice, the switch 28 will opencircuit at approximately 150 psi.

It may be appreciated that interruption of the cell discharge will continue only until the excessive condition is dissipated. The cell may consequently be discharged at high rates without damage or required replacement.

It may be further appreciated that mamy modifications may be made to the embodiment described herein which are obvious to one skilled in the art. The invention described in the present application is therefore not to be limited by that description, but only by the claims appended hereto.

I claim:
1. An electrochemical cell comprising:
  a hermetically sealed housing having an outwardly deformable wall section;
  an electrochemical system disposed within the housing and including a pair of electrodes respectively forming an anode and a cathode, and an electrolyte in contact therewith;
  a cover assembly affixed to the housing, at least a portion of which serves as a first terminal associated with one of the electrodes;
  a second terminal associated with the second electrode; and
  a normally closed thermal switch disposed between the cover assembly and the housing and electrically connected between one of the electrodes and its associated terminal, the switch being arranged to open-circuit the internal electrical circuit of the cell when the cell temperature exceeds a preselected level to interrupt cell discharge, the switch being responsive to the wall section deformation to open-circuit the internal electrical circuit of the cell to prevent cell discharge when the internal cell pressure exceeds a pre-determined level.

2. The cell of claim 1 wherein the thermal switch comprises:

a bimetallic element for electrically connecting the terminal and its associated electrode and being deformable at excessive cell temperatures to interrupt the connection, the bimetallic element being positioned such that displacement of the deformable wall section in response to excessive cell pressure deforms the bimetallic element to interrupt the connection.

3. The cell of claim 2 wherein the thermal switch further comprises:

a first contact surface electrically connected to the electrode;

a second contact surface electrically connected to the terminal;

a bimetallic strip normally contacting the contact surfaces at opposite ends, one of the ends being moved away from its respective contact surface in response to excessive cell temperature or pressure.

4. The cell of claim 3 including a lever element responsive to the displacement of the wall section to displace the movable strip end by a relatively greater amount.

5. The cell of claim 4 wherein the lever element comprises:

a generally V-shaped piece of spring steel positioned between the wall section and the bimetallic strip so that its apex is engaged by the wall section, one end is in pivoting engagement with the cell cover, and the remaining end engages the bimetallic strip, the apex being off-center so that the displacement of said remaining end is greater than the displacement of the apex.

6. The cell of claim 5 wherein the deformable wall section comprises a diaphragm.

* * * * *